Aug. 25, 1936.   J. T. McCUTCHEON   2,052,480
PHOTOGRAPH FILM HOLDER
Filed Nov. 13, 1935   2 Sheets-Sheet 1
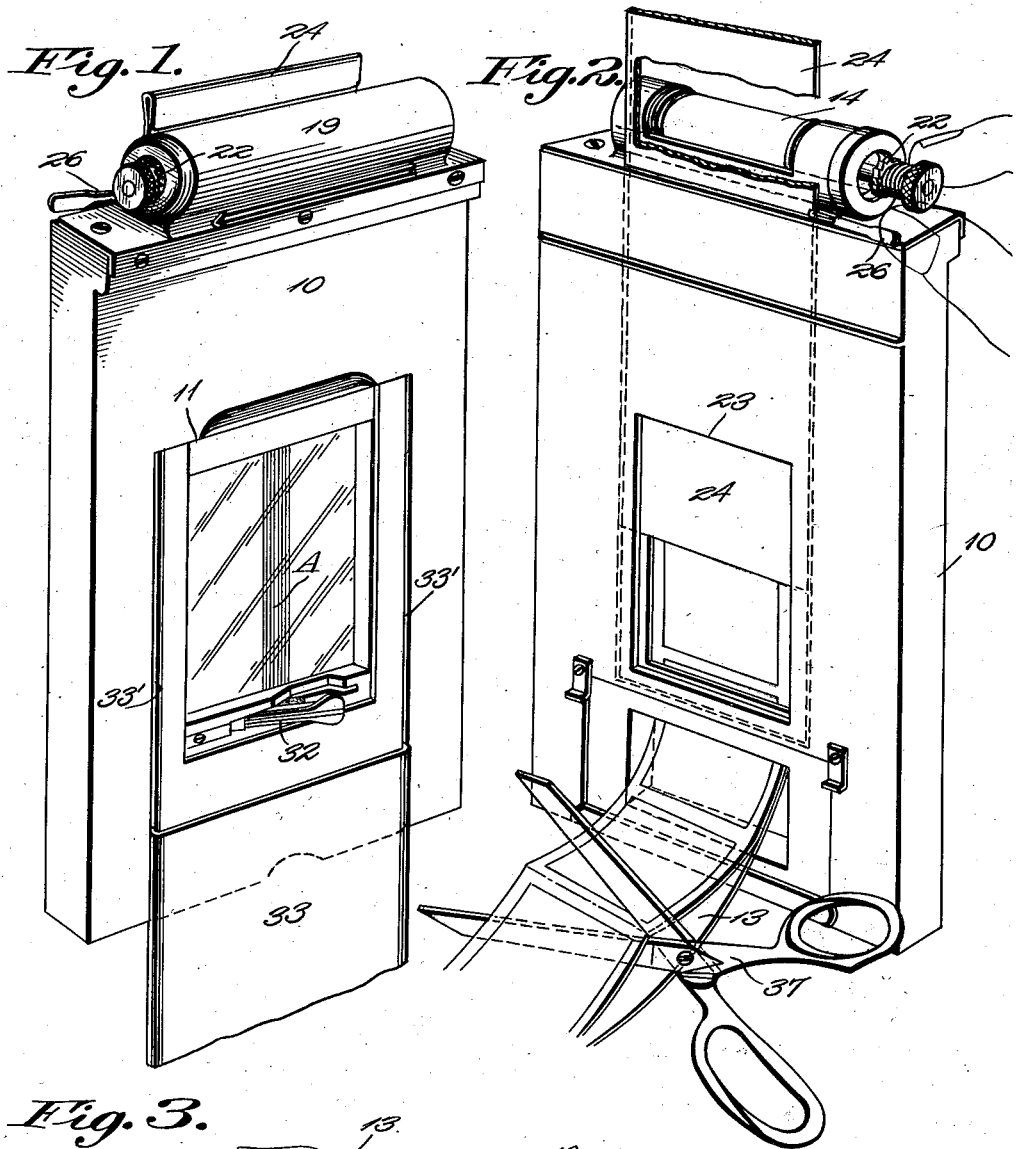
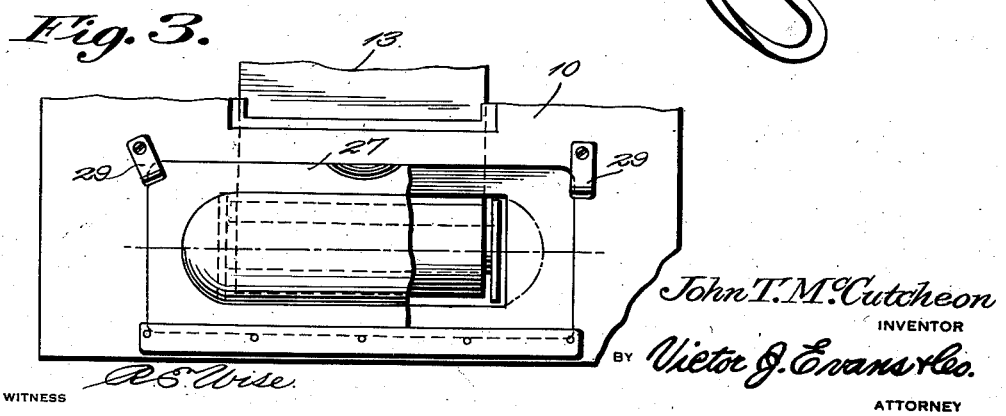
John T. M. Cutcheon
INVENTOR
BY Victor J. Evans & Co.
ATTORNEY
WITNESS Aug. 25, 1936.  J. T. McCUTCHEON  2,052,480
PHOTOGRAPH FILM HOLDER
Filed Nov. 13, 1935   2 Sheets-Sheet 2
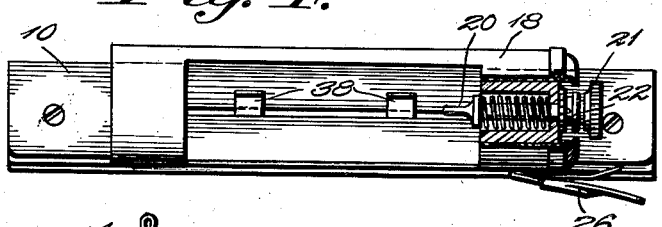
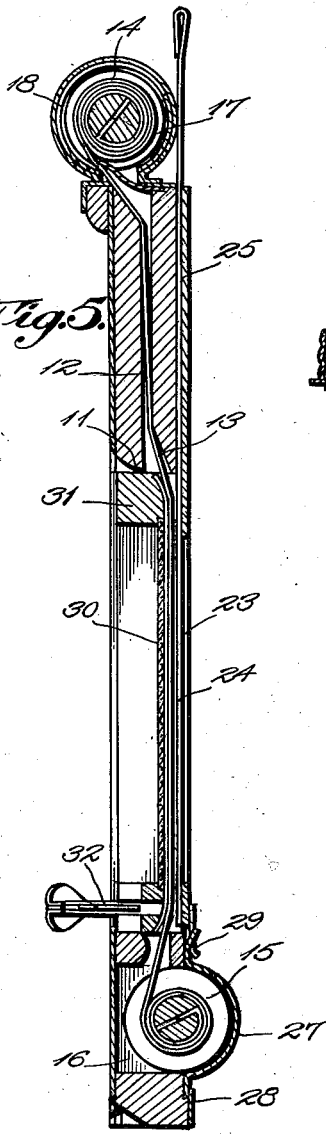
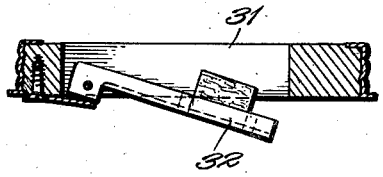
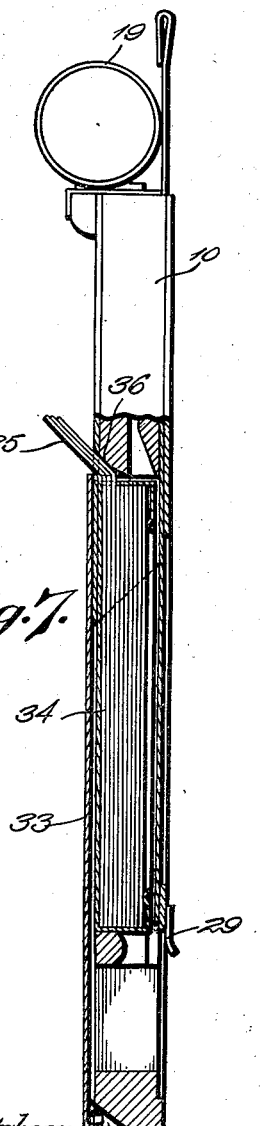
John T. McCutcheon
INVENTOR
BY Victor J. Evans & Co.
ATTORNEY
WITNESS Patented Aug. 25, 1936

2,052,480

UNITED STATES PATENT OFFICE 2,052,480

PHOTOGRAPH FILM HOLDER

John T. McCutcheon, Gainesville, Tex.

Application November 13, 1935, Serial No. 49,586

6 Claims. (Cl. 95—31)

The invention relates to a photograph film holder and more especially to film roll or pack adapters for cameras.

The primary object of the invention is the provision of a holder or adapter of this character, wherein a film roll can be fitted therein and either a full or half picture exposure of the same may be had and under each exposure a marking is indicated, the exposed portions being readily separable from the roll until the complete roll exposure has been had, thus enabling a user to expose any part or portion of the roll for the development of the film without destroying the unexposed portion of such film and by the marking of the vacuum for the film roll it can be determined at a glance the number of exposures made or the extent of the used film as held within the holder or adapter.

Another object of the invention is the provision of a holder or adapter of this character, wherein the film when within the same is readily accessible for the separation of an exposed part thereof and thus eliminating the necessity of the removal of the entire film roll from said holder or adapter.

A further object of the invention is the provision of a holder or adapter of this character, wherein either a film roll or a film pack can be placed therein for exposure in the taking of pictures and thereby making the said holder or adapter universal in use, the holder or adapter being novel in construction and is capable of fitting within cameras of varying types.

A still further object of the invention is the provision of a holder or adapter of this character, which is comparatively simple in construction, thoroughly reliable and efficient in its operation, readily and easily loaded with a film roll or film pack, susceptible of making various exposures of a film roll or pack, that is a full or half exposure, strong, durable and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a perspective view of a holder or adapter constructed in accordance with the invention and in position for exposing a part of a film roll.

Figure 2 is a perspective view showing the manner of separating a part of the film roll after exposure has been made.

Figure 3 is a fragmentary elevation showing in detail the location of the let-off spool for the film roll.

Figure 4 is a top edge view showing the location of the take-on spool for the film roll.

Figure 5 is a vertical transverse sectional view through the holder or adapter.

Figure 6 is a horizontal sectional view thereof showing the marker for identifying exposure of a film roll.

Figure 7 is a side edge elevation showing the holder or adapter accommodating a film pack and the same being partly in section.

Similar reference characters indicate corresponding parts throughout the several views in the drawings.

Referring to the drawings in detail, the holder or adapter comprises a board-like body 10 having formed therein a substantially rectangular shaped recess 11 which opens through one face of the body 10 and this recess is intersected by a way 12 for the backing or carrier strip 13 of a film roll 14, the backing and film of this roll 14 being fed from a let-off spool 15 removably confined within a chamber 16 provided in the body below the recess 11 and is delivered onto a take-on spool 17 held within a cylinder or barrel 18 built upon the body 10 at the top edge thereof. The cylinder or barrel 18 has removably telescoped thereon a cover 19 which when slipped or pulled off of the same from one end thereof allows access to be had to the interior of the cylinder or barrel for the placement or removal of the spool 17. This spool is controlled by a spring tensioned releasable key 20 having externally of the barrel or cylinder the knurled finger knob 21 and such key is ratchet controlled for turning in one direction at 22.

Confronting the recess 11 and formed at one side of the body 10 is an exposure window 23, it being opened and closed by a shutter or slide 24 fitting in a guideway 25 provided in said body. Coacting with the shutter or slide 24 is a spring tensioned finger released latch 26 which holds the shutter or slide 24 in a position to uncover one half of the window 23 so that half exposure therethrough can be had, this position of the slide or shutter 24 being shown in Figure 2 of the drawings.

Closing the chamber 16 for the spool 15 is a removable cover 27 which engages a retaining strip 28 and also engaged therewith are swinging catches 29 so that it can be separably fastened in covering position to the spool 15 when within the chamber 16. This cover piece 27 on removal permits the insertion or removal of the spool to and from the chamber 16 as will be apparent Figures 3 and 5 of the drawings.

Removably fitting within the recess 11 is a colored panel or pane 30, it being carried in a frame 31, the color of the panel or pane 30 being such as to prevent damage to the film from light rays and makes visible the backing strip 13 for the film roll 14 and such color may be preferably either orange or ruby. The frame 31 for the panel or pane 30 has fitted therewith a marker 32 which is held in marking position with respect to the backing strip 13 when a closure slide 33 covers the recess 11 and this slide is engaged in suitable guideways 33' provided in the body 10. The marking as at A on the backing strip 13 is clearly visible through the panel or pane 30 on the feeding of the film roll so that one can readily determine on the opening of the recess by uncovering the same through the instrumentality of the slide as the marking on the strip can be seen through the panel or pane and thereby identifying the exposed portion of the film.

On removing the frame 31 with the panel or pane 30 a film pack 34 of standard make can be inserted in the recess 11 for the exposure of the films within the said pack 34 through the window 23, the tabs 35 for control of the exposure of the films within the pack 34 being projected through a notch 36 at one end of the recess 11. It is understood, of course, that when the pack 34 is within the recess 11 the slide 33 is in covering relation to said recess as will appear in Figure 7 of the drawings.

When only a part of the film roll has been exposed and it is desired to separate such exposed part the film exposed is pulled from the chamber 16 by removing the spool 15 therefrom and separating the film from the backing strip 13. Scissors 37 can be brought into position for cutting the film as is clearly shown in Figure 2 of the drawings. Then by replacing the spool the backing strip 13 will continue the feed of the unexposed part of the film for exposure through the window 23 for the taking of further pictures. It is, of course, understood that to remove the spool 15 from the chamber 16 the cover piece 27 is detached.

Suitably mounted in the body 10 to be extended into the barrel or cylinder 18 are spring members 38 which tension and guide the film and backing strip of the roll 14 when delivered onto the on-take spool 17 for the smooth winding thereon.

In the use of the holder or adapter, it will be clearly understood that a film roll or a film pack is useful therein for exposures of the film and in the use of the film roll the marking of the backing strip 13 thereof will be automatically had to identify or indicate the extent of exposure of such film for demarcation so that part of the film from the unexposed part of the same and the exposed part of the film is readily accessible for the separation thereof so that the unexposed part of the film can be completely used and thereby avoiding waste or the destroying of the complete film roll as is ordinarily required when only exposing a portion or part of the same. Also by the latch 26 the shutter or slide 24 can be held to enable a half exposure to be made through the window 23 and this half exposure can be had of either the film roll or the film pack, that is a single picture area of such film.

The adapter or holder, that is the body 10 of the same, is susceptible of fitting within cameras of variable standard types so that either a film roll or a film pack is useful therein for exposure in the making or taking of pictures.

What is claimed is:

1. A holder of the character described comprising a flat body having a recess therein and a way for a film and backing strip therefor, said body being further provided with an exposure window confronting said recess, a slide fitting said body for covering said window, a colored paneled frame removably fitted in said recess and a marker device fitted with said frame for indentifying exposed film areas on the backing strip for the film and visible through the colored panel.

2. A holder of the character described comprising a flat body having a recess therein and a way for a film and backing strip therefor, said body being further provided with an exposure window confronting said recess, a slide fitting said body for covering said window, a colored paneled frame removably fitted in said recess, a marker device fitted with said frame for identifying exposed film areas on the backing strip for the film and visible through the colored panel, a film roll barrel carried at one end of the body and having a take-on spool and a let-off spool fitted within the body and delivering the film and its backing strip through said way.

3. A holder of the character described comprising a flat body having a recess therein and a way for a film and backing strip therefor, said body being further provided with an exposure window confronting said recess, a slide fitting said body for covering said window, a colored paneled frame removably fitted in said recess, a marker device fitted with said frame for identifying exposed film areas on the backing strip for the film and visible through the colored panel, a film roll barrel carried at one end of the body and having a take-on spool, a let-off spool fitted within the body and delivering the film and its backing strip through said way and a cover piece removably fitted on the body for concealing the let-off spool.

4. A holder of the character described comprising a flat body having a recess therein and a way for a film and backing strip therefor, said body being further provided with an exposure window confronting said recess, a slide fitting said body for covering said window, a colored paneled frame removably fitted in said recess, a marker device fitted with said frame for identifying exposed film areas on the backing strip for the film and visible through the colored panel, a film roll barrel carried at one end of the body and having a take-on spool, a let-off spool fitted within the body and delivering the film and its backing strip through said way, a cover piece removably fitted on the body for concealing the let-off spool and means for operating the take-on spool.

5. A holder of the character described comprising a flat body having a recess therein and a way for a film and backing strip therefor, said body being further provided with an exposure window confronting said recess, a slide fitting said body for covering said window, a colored paneled frame removably fitted in said recess, a marker device fitted with said frame for identifying exposed film areas on the backing strip for the film and visible through the colored panel, a film roll barrel carried at one end of the body and having a take-on spool, a let-off spool fitted within the body and delivering the film and its backing strip through said way, a cover piece removably fitted on the body for concealing the let-off spool, means for operating the take-on spool and a slide fitted with the body for covering said recess.

6. A holder of the character described comprising a flat body having a recess therein and a way for a film and backing strip therefor, said body being further provided with an exposure window confronting said recess, a slide fitting said body for covering said window, a colored paneled frame removably fitted in said recess, a marker device fitted with said frame for identifying exposed film areas on the backing strip for the film and visible through the colored panel, a film roll barrel carried at one end of the body and having a take-on spool, a let-off spool fitted within the body and delivering the film and its backing strip through said way, a cover piece removably fitted on the body for concealing the let-off spool, means for operating the take-on spool, a slide fitted with the body for covering said recess and means manually operated for latching the first-named slide in adjusted position.

JOHN T. McCUTCHEON.